(12) United States Patent
Payson (10) Patent No.: US 7,193,994 B1  
(45) Date of Patent: Mar. 20, 2007

(54) CROSSBAR SYNCHRONIZATION TECHNIQUE

(75) Inventor: Christopher J. Payson, Bolton, MA (US)

(73) Assignee: Intel Corporation, Santa Clara, CA (US)

(*) Notice: Subject to any disclaimer, the term of this patent is extended or adjusted under 35 U.S.C. 154(b) by 1115 days.

(21) Appl. No.: 10/222,538

(22) Filed: Aug. 16, 2002

(51) Int. Cl.  
*H04J 3/06* (2006.01)

(52) U.S. Cl. ........................ 370/380; 370/503

(58) Field of Classification Search ............ None  
See application file for complete search history.

(56) References Cited

U.S. PATENT DOCUMENTS 6,449,283 B1 * 9/2002 Chao et al. ................ 370/461  
6,725,388 B1 * 4/2004 Susnow .................... 713/400  
6,778,548 B1 * 8/2004 Burton et al. .............. 370/429

* cited by examiner

*Primary Examiner*—Frank Duong  
(74) *Attorney, Agent, or Firm*—Blakely, Sokoloff, Taylor & Zafman LLP (57) ABSTRACT

A technique synchronizes a crossbar switch fabric of a network switch having a plurality of modules configured to transmit and receive data at high speeds. The crossbar switch fabric resides on a switch module and operates on fixed-size cells received at its input ports from line card modules over high-speed serial communication paths of the switch. To eliminate resynchronization between the modules after each serial communications path traversal, each module is allowed to operate within its own clock domain, thereby forcing the entire resynchronization task upon a receive data path of the switch module. Although this results in resynchronization of a "large magnitude", the task only needs to be performed once and entirely on the switch module.

20 Claims, 8 Drawing Sheets

CROSSBAR SYNCHRONIZATION TECHNIQUE

FIELD OF THE INVENTION

The present invention relates to synchronization of switch fabrics in communications networks and, more specifically, to a technique for synchronizing a switch fabric in a network switch of a communications network.

BACKGROUND OF THE INVENTION

A network switch is an intermediate network node that provides a "switching" function for transferring information among entities of a communications network. Typically, the switch is a computer comprising a collection of ports interconnected by a switch fabric. Each port couples the switch to a network entity over any of various types of media, including gigabit Ethernet or Fibre Channel link connections. The network entity may consist of any node, such as an end or intermediate network node, configured to transmit or receive information over the media. The switching function thus generally comprises receiving information at an input port from a network entity, forwarding that information to at least one other output port via the switch fabric and, thereafter, transmitting the information over at least one medium to another entity of the network.

Where only a relatively few input and output ports are needed to receive and transmit data over the communications network at relatively low bandwidth/speeds, the network switch may comprise a single device or module. However, for an application of the switch requiring relatively large numbers of ports (e.g., 64–256) and relatively high bandwidth per port (e.g., 2–10 gigabits per second), a plurality of different modules (e.g., 8–16) may be needed. The modules constituting such a conventional "large" switch may be grouped into three categories: control modules (CM), line modules (LM) and switch modules (SM). The CM provides control and monitoring functions for the operation and health of the switch using low-bandwidth communication paths to all other modules for initialization and maintenance. The LM provides standard format data connections to attach the switch to the network. The SM provides the actual switching function in a switch fabric, such as a conventional crossbar fabric, to transfer data between all LMs in the switch.

One type of crossbar fabric is a variable-sized packet switch fabric adapted to switch packets received over input connections to output connections of the SM. Another type of crossbar fabric used to switch data packets of varying sizes is a cell switch fabric that operates on packets apportioned into fixed-size cells. The fixed sized cells switched by the crossbar fabric are generally smaller than a typical packet size. Upon receiving a packet, an ingress (source) LM apportions that packet into fixed sized cells and forwards those cells to the SM. The cell switch fabric on the SM "switches" the cells and forwards them to an egress (destination) LM, which then reassembles the cells into the packet and forwards that packet over the network.

A cell switch fabric is often less expensive to implement than a variable sized packet switch and facilitates computation of the input-to-output connections. In addition, the cell switch fabric allows for better differentiation of quality of service (QoS) levels and achieves better utilization than the variable sized packet switch. Moreover, the cell switch fabric ensures "fairness" among the variable sized packets switched by the crossbar fabric. That is because of the varying sizes of packets, use of a fixed-sized cell granularity ensures fairness among all packets received at the switch by enabling, e.g., interleaving of cells from large and small packets during the switching function. Packet segmentation and reassembly costs are easily offset by these benefits, such that a cell switch fabric is commonly used in networking equipment.

Since the cell switch fabric operates on fixed sized units or cells, synchronization of the crossbar switch fabric is critical. The cell switch fabric is configured to receive cells from each of the source LMs and forward those cells to one or more destination LMs in the switch. This is generally performed in connection with a fixed "cell time." A cell time is defined as the time needed to receive a cell at an input port of the switch fabric, connect that input port to an output port of the switch fabric and switch the cell to the output port for transfer to a destination LM. If more than one source LM attempts to send a cell to a particular destination LM, an arbitration policy is computed by an arbiter to decide which input port should be connected to the output port of the destination LM. This arbitration decision is also performed during the cell time.

To efficiently perform the switching function, all cells from all source LMs destined for switching should be present at the input ports of the crossbar switch fabric at the same time so that they can be delivered to the destination LMs at the same time. Crossbar synchronization involves aligning all of the cells from source LMs at the input ports of the switch fabric at the same time so that switching may occur in "walk step." The crossbar switch fabric is typically implemented as a multiplexor circuit having a plurality of inputs and a single output. The result of the arbitration decision configures the multiplexor to connect a particular input to the output of the multiplexor. In general, there is a single multiplexor resource per output port of the switch fabric. To efficiently operate the multiplexor, all cells must be present (aligned) at the inputs (input ports) of the multiplexor (crossbar fabric) at the time the arbitration result is applied to that circuit.

Configuration of the LM may be simplified by only having connections to and from the SM, which limits the switch size to the number of connections the SM can support. Every connection to and from the SM is therefore as fast as the interconnect technology allows, in order to maximize the switching bandwidth. For a relatively small switch having relatively low bandwidth of ports, the interconnect technology allows data to be transmitted over electrical wires synchronously. For example, a central clock source provides clock signals to the LMs that enable parallel, synchronous clocking of data between the LMs and SM. The data cells are thus transmitted over a data path comprising a parallel bus that extends between the LMs and the SM.

For this simplified approach, the clock source also sends a synchronization pulse equal to the cell time along with the clock signals. The synchronization pulse is used to align the data cells sent over the parallel bus to the cell switch fabric of the SM. However, as the bandwidth per port and/or number of ports increases, this approach degrades and becomes impractical because, e.g., scaling of the number of ports results in an excessive amount of parallel wires that cannot be manufactured into a practical backplane. The connector structure needed to couple electrical wires between the modules also becomes unwieldy and impractical to install on the backplane. Moreover, the integrity of the clock and data signals transferred over the parallel bus at high bandwidths (i.e., the signal integrity) degrades because of, e.g., interference.

A common solution to this problem is to convert the parallel bus to a data path comprising serial interconnect links that incorporate clock forwarding techniques (with separate clock signal lines) to transmit the data and clock signals between the LMs and the SM. The bandwidth of the parallel wires is generally equal to the bandwidth on the high-speed serial link. For example, if there are 8 parallel input wires, each of which provides 1 megabit per second (Mps) of bandwidth, then the resulting high-speed serial link has a bandwidth of 8 Mps. High-speed communication devices, such as specialized transmitters and receivers, then transfer data between the modules by serializing the parallel data into a bit stream, transferring the bit stream from a transmitter to a receiver, and thereafter accumulating the data back into the original parallel format. Unfortunately, these communication devices introduce significant latency and skew into the data path, often spanning many clock periods. That is, as bandwidth increases (e.g., to greater than 100 megahertz) the serial link approach creates signal integrity issues because of skew that results from, e.g., differing serial link lengths.

One way to increase the bandwidth/speed of data transmitted over the serial link is to send the data over the link without the accompanying (separate) clock signals. Here, the transmitter serializes the parallel data into an encoded bit stream that is decoded at the receiver prior to being converted to parallel format. Conventional clock data recovery (CDR) circuitry on the receiver recovers the data from the encoded bit stream. Broadly stated, the CDR circuitry examines transitions within the serial bit stream to recover embedded clock signals used to sample the encoded bit stream and recover the original input frequency of the transmitted data. Therefore, the original input frequency $f_i$ of the data at the transmitter is equal to the recovered output frequency $f_o$ of the data at the receiver.

However, there is no fixed phase relationship between the frequencies $f_i$ and $f_o$. In fact, there are typically phase differences between the frequencies that could extend beyond a single clock period, resulting in "shifting" of recovered data at the receiver. That is, even though the data recovered by the CDR circuitry is identical to that transmitted over the serial link, the recovered data may be shifted in time to thereby create a phase displacement between the input frequency $f_i$ and output frequency $f_o$ of the data. The phase differences cause cells to arrive at the switch fabric at different times, thereby obviating the attempt to align data at the crossbar fabric for switching at a defined cell time. This misalignment or phase shift may be due to differences in etch lengths between the LMs and SM, along with process, voltage and temperature (PVT) variations among CDR logic within the various receivers in the switch. Moreover, differences among implementations and vendors of the specialized transmitter and receiver devices, as well as pointer initialization of those devices, may result in such misalignment.

In sum, the crossbar fabric of a network switch is efficiently implemented when the cells from all source LMs are exactly aligned in time for switching purposes. However, typical module communication techniques introduce substantial skew into the cell delivery path of the switch; when multiple paths are involved in a serial process, more than an entire cell time's worth of skew is injected into those paths. The present invention is directed to a technique that efficiently enables alignment of cells at a crossbar switch fabric.

The invention is further directed to a technique that addresses the skew issue as well as the PVT variations and implementation/vendor differences associated with high-speed serial link transmissions using CDR logic and specialized transmitters/receivers.

SUMMARY OF THE INVENTION

The present invention overcomes the disadvantages of the prior art by providing a technique that synchronizes a crossbar switch fabric of a network switch having a plurality of modules configured to transmit and receive data at high speeds. The crossbar switch fabric resides on a switch module and operates on fixed-size cells received at its input ports from line card modules over high-speed serial communication paths of the switch. To eliminate resynchronization between the modules after each serial communications path traversal, each module is allowed to operate within its own clock domain, thereby forcing the entire resynchronization task upon a receive data path of the switch module. Although this results in resynchronization of a "large magnitude", the task only needs to be performed once and entirely on the switch module.

According to an aspect of the synchronization technique, ring buffers are used at the crossbar switch fabric to absorb all skew introduced into the communication paths through the use of novel control signals. One ring buffer, ConfigBuffer, holds configuration information delivered from an arbiter of the switch soon after arbitration is computed. The information is illustratively embodied as a vector and is held until data of a corresponding cell arrives at the input port from a source line card module for storage in another ring buffer, CellBuffer. The data cell is held in this ring buffer until all cells from all source line card modules arrive at the switch fabric for switching at the same time period. When the configuration vector and the corresponding data cells have arrived for all input ports, the ring buffers are read in parallel for all ports and the crossbar fabric is programmed to transfer all cells from source line card modules to destination line card modules of the switch.

In the illustrative embodiment, the minimum depth of the ring buffers is determined by the maximum time between issuance of a grant by the arbiter that instructs a source line card module to transmit a cell and switching of the granted cell by the crossbar fabric, hereinafter referred to as the "loop time." Although the majority of latency within the loop time is in the cell fetch and transmit logic on the source line card module, some highly variable latencies manifest in the inter-module communication paths. The ring buffers are accessed by constantly incrementing write and read pointers, with the read pointer "chasing" the write pointer by a fixed offset.

To correctly set, i.e., initialize, the pointers associated with the ring buffers, three control signals are utilized. These control signals assert during one cell time "slot" every predetermined number of cell time slots ("SyncPeriod") to align (or check the alignment if already aligned) the data path. Illustratively, SyncPeriod is an arbitrary integer multiple of the depth of the ring buffers, RingDepth, which period is bounded by two quantities: a maximum allowable overhead (defining the minimum period) and a minimum expected error rate (defining the maximim period). One in every SyncPeriod cells is a control cell with no user data; as a result, SyncPeriod may be arbitrarily large to reduce the control cell overhead below a desired level. SyncPeriod may also be related to an expected error rate of the data path for lossy paths.

A first control signal, ConfigMark, travels with the configuration vector from the arbiter to the crossbar switch fabric and asserts at a period equal to an integer multiple of the RingDepth. Upon reception of this signal, the Config-Buffer sets its write pointer to zero so that the next configuration vector is written starting at location zero. The ConfigMark signal also travels to all source line card modules so that they generate a control cell for that time slot. A second control signal, CellMark, travels with a stream of data cells and represents overhead of the novel synchronization technique. CellMark may be embodied as a sideband bit, an in-band control bit or even an entire special control cell with no user data. Upon reception of this signal, CellBuffer sets its write pointer to zero so that the next cell is written starting at location zero.

A third control signal, CellSync, also travels from the arbiter to the crossbar fabric and asserts at a period equal to an integer multiple of the RingDepth, but is out-of-phase with the ConfigMark signal. The time difference from ConfigMark to CellSync is greater than the loop time, but smaller than the time to traverse one ring buffer. Upon reception of this third signal, both ConfigBuffer and CellBuffer set their read pointers to zero so that the next configuration vector and the next cell are read in parallel from locations zero in both buffers. As soon as every control signal asserts once, the data path is in synchronization and remains synchronized as long as the source line module and switch module clock signals are truly synchronous. Subsequent steady streams of configuration vectors and data cells should thereafter be aligned.

Advantageously, the crossbar synchronization technique is generic in the sense that many of its parameters are flexible and scale well with bandwidth and/or technology. For example, the novel synchronization technique is scalable in terms of cell size, port count, bandwidth, and inter-module latency and skew. Cell size and RingDepth determine the required memory per port, which can easily be kept under one kilobyte per port. In addition, there is no feedback in the data paths and, as such, there is no minimum cell size constraint. The ring buffer requirements increase linearly with the number of ports and there is no port-to-port signaling. As for scalable bandwidth, no feedback paths and no inter-port signaling imply that this parameter scales with technology to go as fast and wide as memory allows. Also, simply expanding or contracting the ring buffer depth allows scaling to adapt to smaller or larger latencies, skews or line card module cell fetch times.

Moreover, the synchronization technique operates well with clock signals on each module that are not locked in frequency, but are within a certain "parts per million" tolerance of each other. Conventional serializer/deserializer devices use a simple rate-matching approach of adding or dropping special symbols to match frequency variances manifested in commodity oscillator devices. This approach works as long as the special add/drop symbols are contained only with control cells, which requirement can be easily met with the novel synchronization technique.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
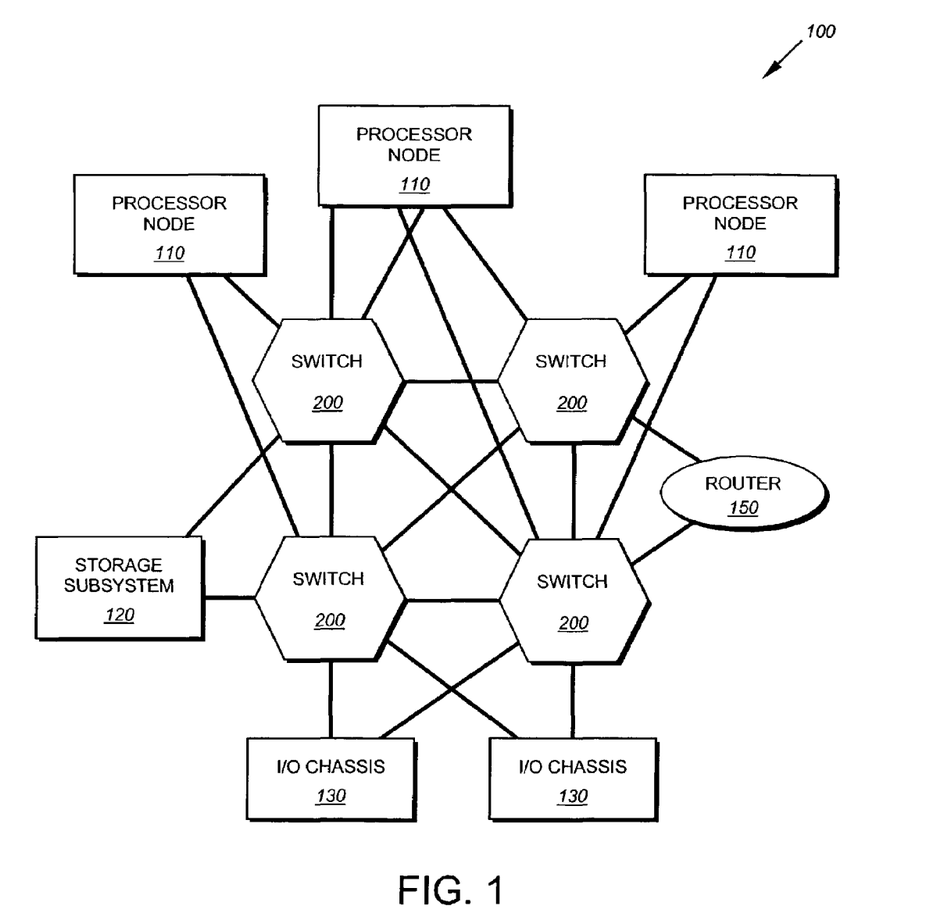
FIG. 1 is a schematic block diagram of a communications network that may be advantageously used with the present invention.

FIG. 1 is a schematic block diagram of a communications network that may be advantageously used with the present invention. The communications network is illustratively embodied as an InfiniBand Architecture (IBA) system area network 100 comprising a plurality of end nodes, such as processor nodes 110, a storage subsystem node 120 and input/output (I/O) chassis nodes 130, interconnected by intermediate network nodes, such an IBA router 150 and IBA switches 200. However, it will be understood to those skilled in the art that the inventive technique described herein may apply to any type of communications network with end nodes and intermediate nodes that communicate by exchanging discrete packets of data according to predefined protocols. In this context, a protocol consists of a set of rules defining how the nodes interact/communicate with each other. For example, the nodes of communications network 100 communicate by exchanging IBA packets. An IBA packet is an indivisible unit of IBA data transfer and routing consisting of one or more headers, a packet payload and one or two cyclic redundancy checks.

Each processor node 110 includes at least one central processing unit, a memory and at least one host channel adapter coupled to a switch 200. The storage subsystem node 120 comprises a collection of storage devices organized in, e.g., a redundant array of inexpensive disks (RAID) configuration and connected to a switch 200 via a target channel adapter (TCA). Each I/O chassis node 130 comprises a collection of I/O modules adapted to provide connectivity to I/O devices and/or other computer networks, such as the Internet, coupled to, e.g., Fibre Channel and/or gigabit Ethernet links. Whereas the router 150 transports IBA packets between subnets of the network, the network switch 200 forwards those packets from one link to another of the same subnet.

Network Switch

Figure 2:
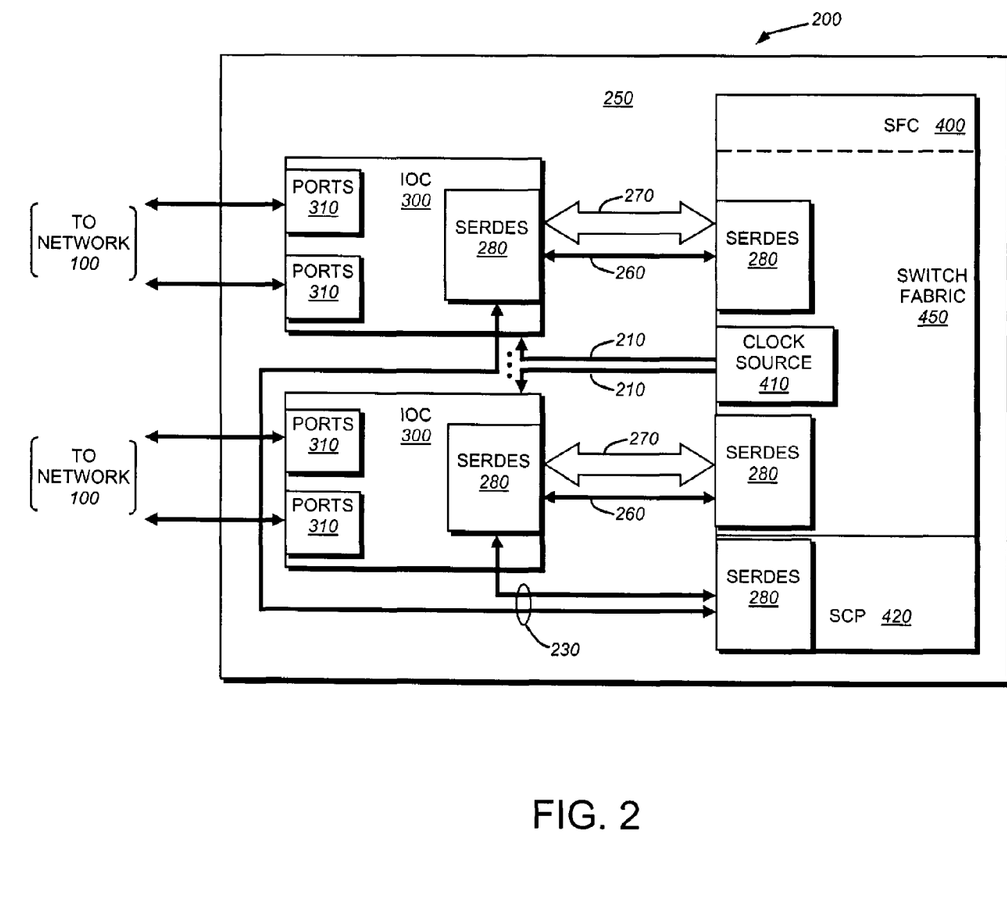
FIG. 2 is a schematic block diagram of a network switch having a plurality of input/output card (IOC) modules coupled to a switch fabric card (SFC) module.

FIG. 2 is a schematic block diagram of switch 200 including a plurality of line card or input/output card (IOC) modules 300 and a switch fabric card (SFC) module 400. An example of a network switch that may be advantageously used with the present invention is the Director Switch available from InfiniSwitch Corporation, Westborough, Mass. The switch 200 includes a plurality of IOC modules that connect the switch to the network 100 and the SFC module 400. The SFC contains a switch control processor (SCP 420) and a switch fabric 450 organized as a crossbar switch to interconnect data paths between the IOC modules 300 of the switch. Each SFC module also contains a central clock source 410 that distributes synchronous clock signals over radial clock lines 210 throughout the switch for use by logic on the modules. However, it will be apparent to those skilled in the art that other clock distribution methods, such as asynchronous clocking, may be used in connection with the inventive technique described herein.

In the illustrative embodiment, each IOC module 300 includes eight (8) 1x ports 310, wherein each port accommodates 2.0 gigabits per second (Gbps) of data. Specifically, 2.5 Gbps of information are received/transmitted by a port 310, of which 2.0 Gbps are raw data with the remainder comprising encoding overhead. Therefore, 16 Gbps of data traffic flow are passed through "ingress" IOCs, forwarded to the SFC module 400 and switched to "egress" IOCs. Such large amounts of traffic are not feasibly transported over parallel buses of a backplane.

Therefore, the switch 200 preferably employs serializer/deserializer (SERDES 280) devices to limit the number of physical wires constituting a backplane 250 of the switch. At the interface between the IOC modules 300 and the backplane, these SERDES devices convert parallel data to serial data for transmission over high bandwidth serial links of the backplane 250 to the SFC module 400. SERDES devices located at the interface between the SFC module and backplane re-convert the serial data to parallel data for processing on the module. Serial data transported throughout the switch is converted to parallel data on each module to allow use of, e.g., field programmable gate array (FPGA) devices that are configured to operate with parallel data.

Specifically, the SCP 420 is coupled to each IOC 300 in the switch over a 781.25 megabit per second (Mbps) serial link 230. Data links 270 couple the SFC 400 to each IOC 300, wherein each data link 270 preferably represents a bundle of four (4) 3.125 gigabit per second (Gbps) serial data links. Grant/request signals flow over 3.125 Gbps control links 260 between each IOC 300 and each SFC 400. That is, requests for arbitration are passed over these serial control links 260 by IOCs to the SFC and grants are returned by the SFC to the IOCs over the links 260.

Figure 3:
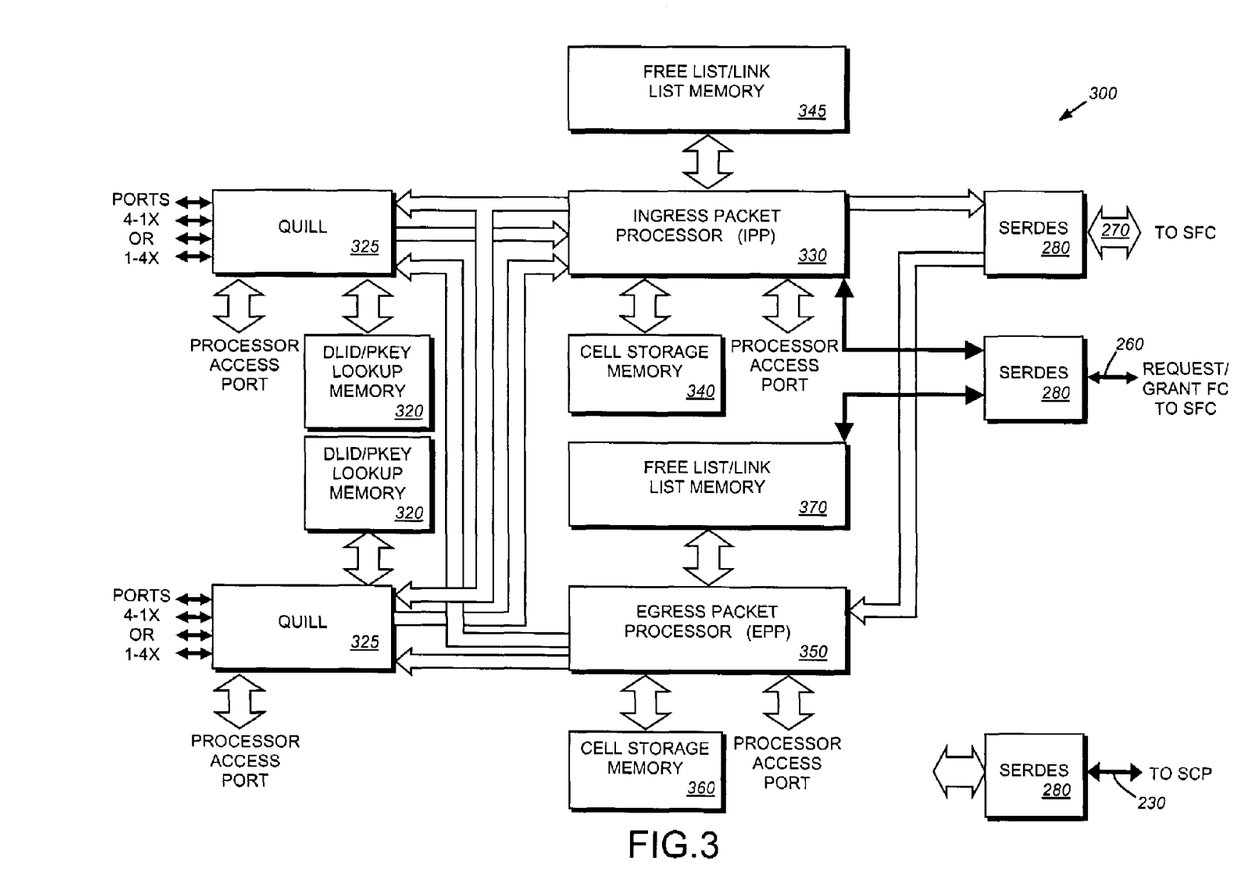
FIG. 3 is a schematic block diagram of an IOC module that may be advantageously used with the present invention.

FIG. 3 is a schematic block diagram of an IOC module 300 that is partitioned into egress and ingress paths for transmitting and receiving packets to and from the network 100. Broadly stated, the ingress path of each IOC comprises logic that "understands" the format of packet bits received over the network links, along with logic that examines headers of the packets and places those packets onto queues that are scheduled for servicing by the crossbar switch fabric. The egress path of each IOC comprises logic configured to receive a stream of packet cells from the ingress paths of all IOCs and reassemble those cells into a packet for transmission from the switch. Notably, an ingress path on a particular IOC utilizes the switch fabric 450 to send information to its corresponding egress path on that IOC.

The IOC 300 comprises an egress packet processor (EPP 350) and an ingress packet processor (IPP 330) that cooperate with a plurality of Quad Infiniband Link Layer (QUILL) interface devices 325 to provide egress and ingress buffering and queuing systems for the egress and ingress paths, respectively. A plurality of SERDES devices 280 is provided to translate data from parallel to serial (and serial to parallel) formats for transmission (and processing) throughout the switch. The QUILL devices 325 also form link interfaces between ports 310 of the IOC module 300 and the network 100. There are illustratively two QUILL devices per IOC, wherein each QUILL 325 is configured to operate with a physical device interface, such as a TCA that provides, e.g., Fibre Channel or gigabit Ethernet link connections to the switch. However, native IBA links can also be coupled to the switch via each QUILL.

In the illustrative embodiment, each QUILL 325 extracts headers from IBA packets received over the network 100 to perform lookup operations into a lookup memory 320 using destination local identifier (DLID), service level (SL) and protection key (PKEY) values stored in the headers in connection with, e.g., a lookup table engine. Briefly, the DLID and SL values are used to determine the destination (e.g., port and virtual lane) of the packets, whereas the PKEY value is used as a simple form of password protection. When a packet is received over a port 310 of the switch, the QUILL performs a lookup operation into memory 320 using these values. As a result of the lookup operation, the values are translated to virtual output queues (VOQ) in the ingress buffering and queueing system. The QUILL then forwards the received packet to the IPP on the ingress path.

The IPP 330 comprises logic circuitry configured to segment and store a received packet as fixed size, 64-byte cells. The 64-byte cell size is illustratively reflective of a credit used in flow control for the IB architecture and comprises 60 bytes of data and 4 bytes of header information that is internal to the network switch (i.e., not IBA header information). Each packet is characterized as a data flow based on the input port 310 at which the packet is received at the IOC. The sizes of packets that are apportioned into data cells vary, according to the IBA, from 20 bytes to 4096 (4k) bytes.

The packet data flow is segmented into the fixed size cells and stored in an external ("off-chip") ingress cell storage memory 340. Those stored cells are then enqueued onto the VOQs of the queuing system. Specifically, the IPP maintains a free list of 64-byte buffers 345 that are linked together to form a linked list of cells of a packet context. A packet context is an internal (i.e., within the switch) representation of a flow of cells associated with a packet. Once the linked list is formed, a head of the list is linked onto a VOQ for transmission over the switch fabric 450.

The IPP also includes a scheduling function that enables each IOC to arbitrate for access to the switch fabric 450 in order to transfer data. A "sticky" packet policy is illustratively used for scheduling cells on the VOQs for transfer through the switch. The sticky policy is implemented on a per-switch port basis and allows an ingress path of a source IOC to have N packets in process at a time (interleaving cells to the SFC), where N equals the number of switch ports (and also the number of IOCs). For a given ingress path-to-switch port path, the packet is "sticky", i.e., the ingress path will not interleave cells from multiple packets to the same destination switch port.

Specifically, once a decision has been made to transfer data to a switch port of the switch fabric from a VOQ on an IOC 300, the packet "stored on" the VOQ is exhausted (i.e., is "run" to completion) prior to transferring data from another VOQ to another switch port. That is, once a dequeue operation begins on a VOQ of an IOC, subsequent dequeue operations are directed to that VOQ until all cells of the queue are switched through the switch fabric. Upon exhausting all cells on a VOQ, arbitration then proceeds among all other VOQs on the IOC that require service by the switch fabric. As a result of such arbitration, a next VOQ is selected for dequeue operations of cells requiring switching through the network switch. Each IOC then transfers cells stored in the memory 340 over data path 270 to the switch fabric. Cells from source IOCs may be interleaved for switching to different output queues of destination IOCs in the switch. Although one source IOC may send one packet at a time through the switch fabric, switched cells may be collected from multiple source IOCs at destination IOCs.

The EPP 350 comprises logic configured to receive and process a stream of cells switched by the switch fabric 450. The EPP resides on the egress path of each IOC and comprises one output queue for each output port on the IOC. The stream of cells is stored in selected buffers of cell storage memory 360 until the cells are linked in a particular context for transmission from the switch over an egress link. The EPP manages reassembly of cells into a packet context using cell storage memory 360 and free list/link list memory 370, as described with the IPP. The cells of packets are fully stored in the cell storage memory 360 until they are selected for transmission over the egress link as a packet. The selected packet is then transferred from the EPP 350 to the QUILL 325, where it is forwarded over egress links of the switch.

Figure 4:
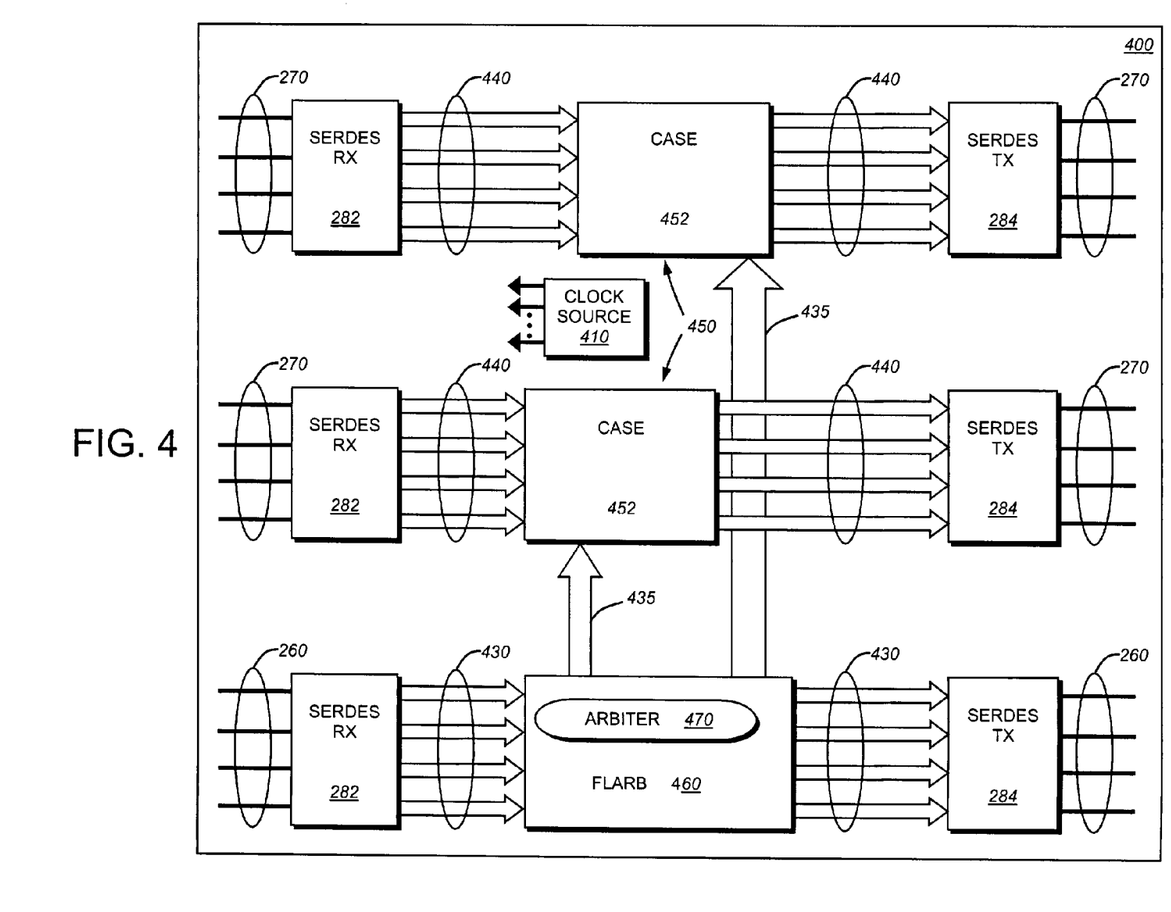
FIG. 4 is a schematic block diagram of the SFC module comprising a crossbar switch fabric that may be advantageously used with the present invention.

FIG. 4 is a schematic block diagram of the SFC module 400 comprising a clock source 410 and a switch fabric 450 configured to operate on fixed-size cells transferred by IOCs to the SFC over high-speed serial communication paths of the switch. The switch fabric 450 interfaces to the IOC modules 300, a flow control and arbiter (FLARB) device 460 and various SERDES devices. The switch fabric 450 illustratively comprises two 10×10 cell alignment and switch engine (CASE 452) crossbar devices coupled to non-integrated receive (SERDES Rx 282) and transmit (SERDES Tx 284) devices that translate data from serial to parallel (and parallel to serial) formats. The FLARB 460 comprises a central arbiter 470 that controls both CASE devices 452 on the SFC 400 to, among other things, keep them in synchronization.

Operationally, each IOC 300 may send a request over control links 260 to the arbiter 470 embodied on the FLARB device 460. The SERDES Rx device 282 receives data over a plurality of (e.g., four) high-speed serial links 260 and transposes it to data over a parallel bus 430 operating at a lower frequency that can be handled by conventional FPGA logic. In particular, the SERDES device 282 translates serial data into parallel data and forwards that data to the arbiter 470, which implements a conventional SLIP arbitration algorithm. The arbiter 470 renders a decision based on all the requests received from all the IOCs and resolves any conflicts that may arise. In response, the arbiter issues grants over bus 430 that are converted by the SERDES Tx device 284 for transmission over links 260 to the IOCs. At the same time, the FLARB 460 issues configuration information to each of the CASE devices 452 over independent control lines 435 between the CASE and FLARB devices.

The configuration information comprises control information in the form of a vector that instructs each crossbar device 452 to connect an input switch port to an output switch port of the switch fabric at a particular time. The configuration vector synchronizes the switch such that ingress source IOCs transmit cells to the switch fabric 450 over serial links 270 for transmission to egress destination IOCs. Since the switch is based on synchronous switching, all arbitration, data transmission and switching aspects of the crossbar devices 452 must also be synchronized across those serial links, which are thereafter transposed into parallel links 440. The cells switched by the SFC 400 are then forwarded to the EPPs 350 of destination IOCs 300.

Crossbar Synchronization

At SERDES receiver logic (e.g., SERDES Rx devices 282) coupled to the high speed links of the backplane 250, serial data is converted to parallel data for processing on each of the modules. Transmission of information over the high-speed serial links is synchronous and lossless; that is, when a bit is converted to serial data it is reliably transmitted at high speed over the backplane 250. However, when the SERDES receivers convert the serial information stream to parallel information, there is no guarantee that the converted parallel information is synchronized across the various SERDES Rx devices. This is particularly evident when the serial path from one source IOC to the SFC 400 is of a different length than the serial path from another source IOC to the SFC, as well as when there are different implementations and vendors of the SERDES devices.

Therefore, information received at the SFC 400 from source IOCs of the switch cannot be synchronously organized using only SERDES receiver logic. That is, additional techniques are needed to achieve synchronization using the SERDES devices. In this context, synchronization denotes alignment of cells for switching at the SFC. As noted, the switch fabric 450 of the SFC 400 is illustratively organized as a crossbar switch and, accordingly, requires synchronized switching of data, particularly for information transmitted as fixed size cells through the switch. Synchronized switching, in this context, illustratively takes place within a defined cell interval or cell time.

Since the serial links are lossless, bits of information transmitted at a predetermined frequency over a high-speed link are received at a SERDES receiver at the exact predetermined frequency without bits added or lost. Although the serial links in the switch illustratively operate at the same frequency, asynchronous links, as noted, may alternately be used in connection with the inventive technique. The central clock source 410 on the SFC 400 radially distributes clock signals to all IOCs (and the SFC) of the switch. These clock signals are used to control the operation of logic circuitry, including the SERDES devices, on all modules of the switch. Therefore, the entire switch illustratively operates relative to a single clock frequency.

However, phase variances introduced by differing serial link lengths between IOCs and the SFC effectively disrupt synchronization among the SERDES receivers on the modules. Even though all the links operate at the same frequency, cells arriving at the SFC for switching may be misaligned in phase. In addition to these differing etch lengths, a source of these phase variants on the modules may include receiver recovery logic, e.g., data clock recovery (CDR) and first-in first-out (FIFO) buffer logic, the latter of which has pointers that may be offset due to the processing of serial data without a reference point. This results in cells arriving "out-of-phase" at the switch fabric.

For example, assume a source IOC sends a request to the SFC for a cell time slot to send a data cell to a destination IOC. Similar requests are sent by other source IOCs at the same time and these requests are collected at the SFC. For every cell time at which it configures the crossbar devices to switch cells from their input ports to their output ports, the SFC considers all of these collected requests in connection with a cell-based arbitration policy executed by the arbiter 470. In accordance with the arbitration policy, the arbiter 470 examines the requests from all source IOCs and makes an arbitration decision as to which IOCs may transmit cells and when those cells may be transmitted. The arbiter then determines a set of connections from the source IOCs to destination IOCs for each cell transfer time period.

Upon rendering the arbitration decision, the arbiter issues grants to the source IOCs that are allowed to send their cells and informs the crossbar fabric via a configuration code (vector) as to where to send those cells. A grant essentially instructs the source IOC to send a cell at a particular cell time to a particular destination IOC. Given the desire for a small cell size combined with the long latency for inter-module communications, this request/grant/configure operation is deeply pipelined to efficiently use the crossbar switch fabric resource. In response to the grants, the source IOCs retrieve the cells from their buffer and queuing systems, and transmit them over their ingress paths to the crossbar switch fabric, which matches the configuration vector to the arriving data cells from source IOCs so that each cell is sent to a correct destination IOC. The crossbar fabric then "switches" those cells to destination IOCs and, in particular, egress paths of those latter IOCs.

The ingress buffering and queuing system of the IOC is used to store the cells from the time the data (packets) arrive at the IOC to the time they are fetched for transmission to the switch fabric. Storage of the data as cells in the buffering and queuing system allows for the accumulation of packets to determine their validity (quality) before transmitting them to the crossbar fabric for switching. The buffering and queuing system also allows reordering of packets (small and large) according to predetermined priority and quality of service (QoS) requirements. Storage of information in the buffer and queuing system further allows sufficient time for the IOCs to generate requests in accordance with the scheduling function of the IOC.

To ensure that proper connections are made through the crossbar fabric at the proper times, the cell data and their associated connection configuration vectors provided by the arbiter must be synchronized at the switch fabric when they are presented to the CASE devices. Synchronization must accommodate the differing link lengths between the IOC and SFC modules and, at the high operational speeds of those links, substantial latencies manifested by those differing lengths. In addition, synchronization must accommodate differing implementations and vendors of the SERDES devices. That is, even though all signaling is synchronized with respect to frequency, the bit times may represent substantial phase variations primarily because of the differences among link lengths of the serial communication paths and among the SERDES devices. To eliminate resynchronization between the modules after each serial communications path traversal, each module is allowed to operate within its own clock domain, thereby forcing the entire resynchronization task upon a receive data path of the SFC module. Although this results in resynchronization of a "large magnitude", the task only needs to be performed once and entirely on the switch module.

The present invention addresses the problem of aligning data cells (including ordinal numbers of those cells) at the crossbar switch fabric through the use of a synchronization technique that includes a control cell flowing at a fixed periodic rate throughout the switch. When arriving at the switch fabric over the receive data path, the data cells from the source IOCs may be offset greater than a cell time; therefore, alignment of the cells at the switch fabric for switching at a specific cell time is needed for correct operation of the switch. The novel control cells are generated on ingress paths of the IOCs and are inserted into the data cell streams as pure overhead at a fixed periodic rate of, e.g., one cell time "slot" out of every 1,024 (1k) data cell time slots or, as used hereinafter, once every SyncPeriod.

The arbiter provides a triggering mechanism that instructs all IOCs to generate the special control cell once every SyncPeriod. In response, each source IOC generates and sends the control cell through the switch fabric and back to an egress path of that IOC. Subsequent grants issued by the arbiter to the source IOCs that grant time slots for those IOCs to transmit cells are relative to issuance of the novel control cell. Identification of the actual time slot is not carried within the grant to a source IOC; instead, the granted time slot is relative to the control cell and is actually computed by all components (e.g., source and destination IOCs, SFC) using counters to essentially count cell times. These components thereafter reset their counters based on the novel control cell.

Figure 5:
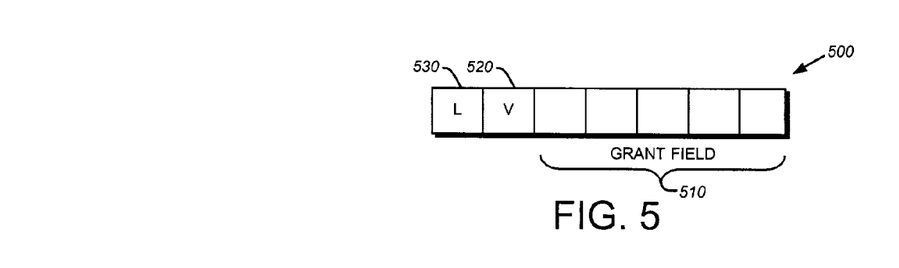
FIG. 5 is a schematic block diagram illustrating a specially marked grant message that may be advantageously used with the present invention.

In the illustrative embodiment, the triggering mechanism is a specially marked grant message generated by the arbiter and provided to the IOCs. FIG. 5 is a schematic block diagram illustrating the specially marked grant message 500. Each grant message includes an encoded value within a grant field that grants a source IOC a time slot to send its cell to the SFC for switching to a destination IOC. Specifically, each grant 500 is a 7-bit message comprising a 5-bit grant field 510 containing an encoded value indicating to which destination IOC (e.g., of a possible 32 destination IOCs) the receiving IOC can send its cell.

The grant message also includes a 1-bit valid field 520 that, when asserted, indicates that the source IOC has been granted a time slot. If the valid bit is not asserted, then no grant has been issued to that source IOC. A last bit 530 of the 7-bit message indicates whether the grant is a specially marked grant message for purposes for generating the special control cell. That is, if the last bit 530 of the message is asserted, the message is the specially marked grant message. In this latter case, the grant field 510 of the specially marked grant message contains a value of the egress path of the source IOC.

A request generated by a source IOC is illustratively a bit mask requesting a time slot to send a data cell from the source IOC to a destination IOC. A bit mask is used for the request because a source IOC may request transfer of cells to more than one destination IOC. However, in the illustrative embodiment, only one of those requests may be granted per cell time. That is, the arbiter may grant the source IOC a time slot to transmit only one cell to one destination IOC during a cell time. A subsequent grant in response to a request is directed to a data cell at the head of a FIFO buffer on the source IOC.

Figure 6:
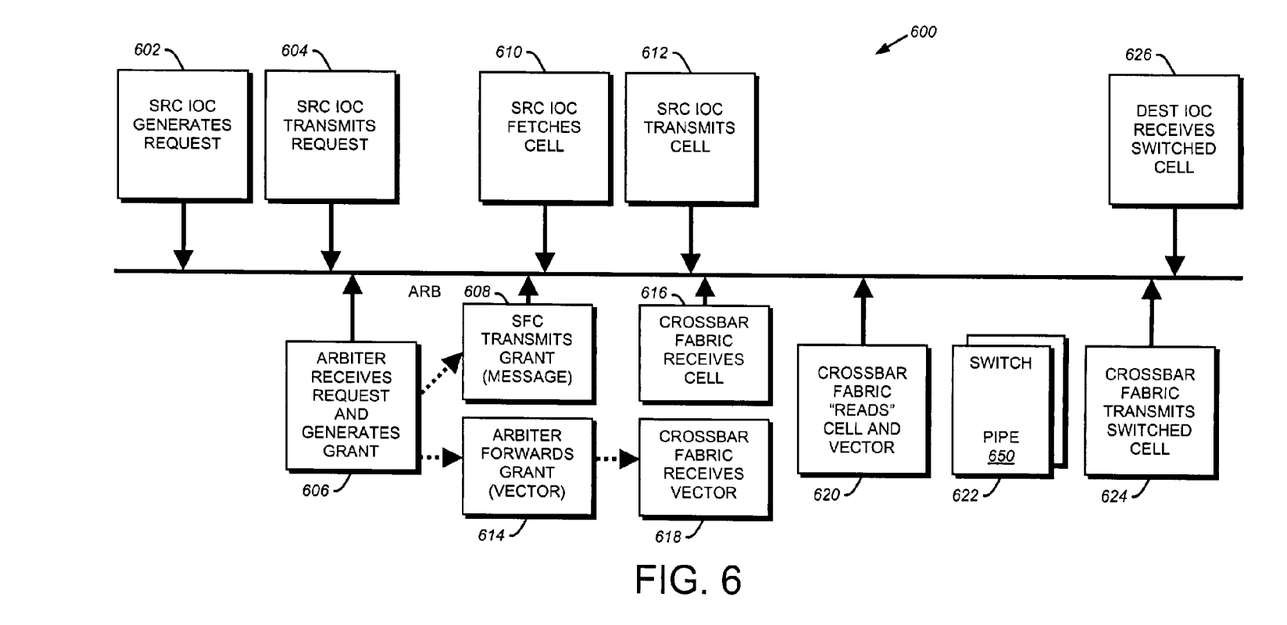
FIG. 6 is a diagram of a timeline illustrating a sequence of events that occur among a source IOC, SFC and destination IOC of the network switch.

FIG. 6 is a diagram of a timeline 600 illustrating a sequence of events that occur among a source IOC, SFC and destination IOC as a result of requesting transmission of, granting such transmission of, and switching a cell over the SERDES serial communication path links through the switch fabric 450. At event 602, a source IOC receives a data packet from the network, apportions the data (packet) into cells and generates a request (REQUEST) to forward those cells to the crossbar switch fabric. At event 604, the source IOC then transmits the request over the control path and through the SERDES devices to the arbiter on the SFC module. At event 606, the arbiter receives the request and performs an arbitration function that results in generation of a grant (GRANT).

The grant comprises two separate "signals", one of which is manifested as a cell (grant message 500) and transmitted over the control path through the SERDES to the source IOC (event 608), acknowledging its associated request for cell transmission to the destination IOC at a particular time slot, e.g., "X", in the future. The source IOC, in response to receiving the grant 500, fetches the appropriate data cell from its buffering and queuing system at event 610. At event 612, the source IOC transmits that cell over its ingress path and through the SERDES devices in time slot X to the crossbar fabric. At event 616, the crossbar switch fabric receives the data cell from the source IOC and loads that cell into a cell FIFO.

Meanwhile, the other grant signal generated by the arbiter is manifested as a vector and is forwarded over the SFC module to the crossbar switch fabric at event 614. The vector comprises configuration information indicating that, at the time slot X, data received from the source IOC is to be switched to the destination IOC. The crossbar fabric receives the grant vector signal from the arbiter and, at event 618, loads that vector into a configuration FIFO. At event 620, the crossbar fabric "reads" the time slot X data cell and configuration vector from all input ports. Thereafter when time slot X arrives, the configuration vector is synchronized with the data cell and the data is switched through the crossbar devices to the destination IOC at event 622.

In the illustrative embodiment, a cell time is 51.2 nanoseconds; this represents the time needed to switch a cell received from a source IOC through the switch fabric to a destination IOC. The cell times occur contiguously and continuously in order to switch cells through the switch. The overall latency from the time a source IOC issues a request to transmit a cell to the time that the cell is actually switched to a destination IOC is substantial. To compensate for that latency, the entire process is highly pipelined and, thus, implemented as a synchronization pipeline 650 to ensure that a cell is switched through the fabric every cell time. The interval between generation of a request at a source IOC to actual switching of a cell through the switch fabric is referred to as a system time interval. As a result of the synchronization pipeline, the switched data cell is transmitted to the destination IOC at event 624. At event 626, the destination IOC receives the switched data cell over its egress path and, after reassembling the packet, forwards the packet over the computer network.

Figure 7:
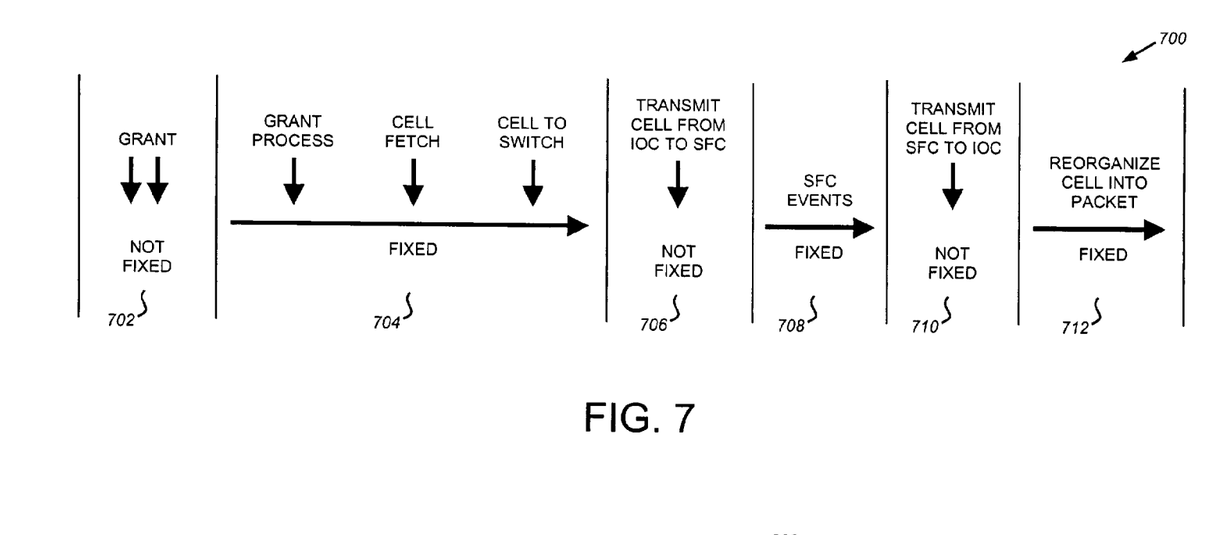
FIG. 7 is a diagram of a graph illustrating various time periods that occur on the timeline of FIG. 6.

The arbiter represents the last uncertainty within the timeline 600 with respect to whether a source IOC receives a grant in response to its request. Once the arbiter renders an arbitration decision and generates a grant for transmission to the requesting (source) IOC and to the crossbar fabric, the events transpiring at the IOC and SFC occur in "lock step" over various fixed and not-fixed time periods. FIG. 7 is a diagram of a graph 700 illustrating various time periods that occur on the timeline 600. For example, the time period 702 reflects the longest period of time between generation of grants at the arbiter and transmission of those grants over the control path to source IOCs. Specifically, the period 702 reflects the time needed to transmit grants (messages 500) from the arbiter to IOCs across different clock domains and over the longest etch lengths with the slowest SERDES devices and with the worst case performing CDR logic. Because the grants may arrive at different times to the different IOCs, time period 702 is "not fixed" and, as described herein, buffers are employed to absorb the differences in arrival times caused by, among other things, skew introduced into the communications path.

The next time period 704 occurs at the source IOCs and involves events such as grant processing, cell fetch and cell-to-switch transmission. These events all occur on each IOC (i.e., the same module) and within the same clock domain; therefore, the time period 704 is fixed. In general, events that occur on the same module are fixed, whereas events that occur between modules are not fixed given, e.g., the uncertain latencies of the SERDES devices and CDR logic. Therefore, the time period 706 involved with transmitting data cells from the IOCs to the SFC is not fixed, since those cells may arrive at the SFC from different IOCs at different times. Time period 708 is fixed, though, since all the events that occur during this period are on the SFC module (such as switching of cells). Similarly, the time period 710 (representing transmission of switched data cells from the SFC to destination IOCs) is not fixed, whereas the time period 712 for events that occur on the destination IOCs, such as obtaining the switched data cells and reorganizing them into packets in egress memories, is fixed.

Notably, all of the "not fixed" time periods involve the SERDES devices and occur because of variable delays associated with those devices. Therefore, these time periods are set to the maximum delays and buffers are used to accumulate cells. In contrast, events that occur entirely on each module (i.e., within the same module) and within the same clock domain represent fixed time period events. Since buffers are used to accumulate cells during the "not fixed" time periods, an issue involves ensuring that cells written (stored) in those buffers are read (retrieved) at the proper times, i.e., in synchronization. The special control cells are used to ensure synchronization throughout the switch and, in accordance with the present invention, to ensure synchronization at the crossbar switch fabric using the novel crossbar synchronization technique.

According to an aspect of the synchronization technique, ring buffers are used at the crossbar switch fabric to absorb all skew introduced into the communication paths through the use of special control signals. The ring buffers may be illustratively embodied as a memory configured as FIFO buffers. One such ring buffer is the configuration FIFO, ConfigBuffer, which holds configuration (vector) information delivered from the arbiter soon after arbitration is computed. The vector information is held until data of a corresponding cell arrives at the input port from a source IOC for storage in another ring buffer embodied as the cell FIFO, CellBuffer. The cell data is held in this ring buffer until all cells from all source IOCs arrive at the switch fabric for switching at the same time period. When the configuration vector and the corresponding data cells have arrived for all input ports, the ring buffers are read in parallel for all ports and the crossbar fabric is programmed to transfer all cells from source IOC modules to destination IOC modules of the switch.

Figure 8:
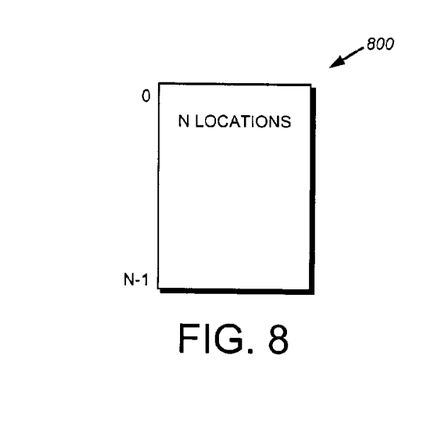
FIG. 8 is a schematic block diagram of a ring buffer that may be advantageously used with the present invention.

FIG. 8 is a schematic block diagram of a ring buffer 800 having N locations (addresses) extending from 0 to N−1, wherein N equals the depth of the buffer. The depth N, RingDepth, of the CellBuffer is generally defined by the delays constituting the "not-fixed" time periods of FIG. 7. In particular, the minimum depth of CellBuffer is determined by the difference between the minimum not-fixed delays and the maximum not-fixed delays, i.e., the not-fixed delay variance. The minimum depth of ConfigBuffer, however, is determined by the maximum time between issuance of a grant by the arbiter that instructs a source IOC to transmit a data cell and switching of that cell by the crossbar fabric, hereinafter referred to as the "loop time." Although the majority of latency within the loop time is in the cell fetch and transmit logic on the source IOC, some highly variable latencies manifest in the inter-module communication paths.

The crossbar switch fabric 450 is illustratively constructed as a plurality of output switch ports, each having a selector with an input from each of the IOCs. These switch ports are located on each CASE 452 and generally comprise input queues of cells received from source IOCs and a simple register pipeline (or, alternatively, output queues) of switched cells destined for destination IOCs. When configuring the switch fabric, each of these output switch ports is instructed to configure its selector to pass data from a particular input to its output at a particular cell time. Therefore, each CASE device further includes queues or buffers for storing configuration vector information pertaining to grants generated by the arbiter 470 and associated with the input cells to be switched during the cell time. Each configuration vector generated by the arbiter comprises an instruction provided to the selector that enables (selects) an input to pass a data cell to the output of the selector.

Figure 9:
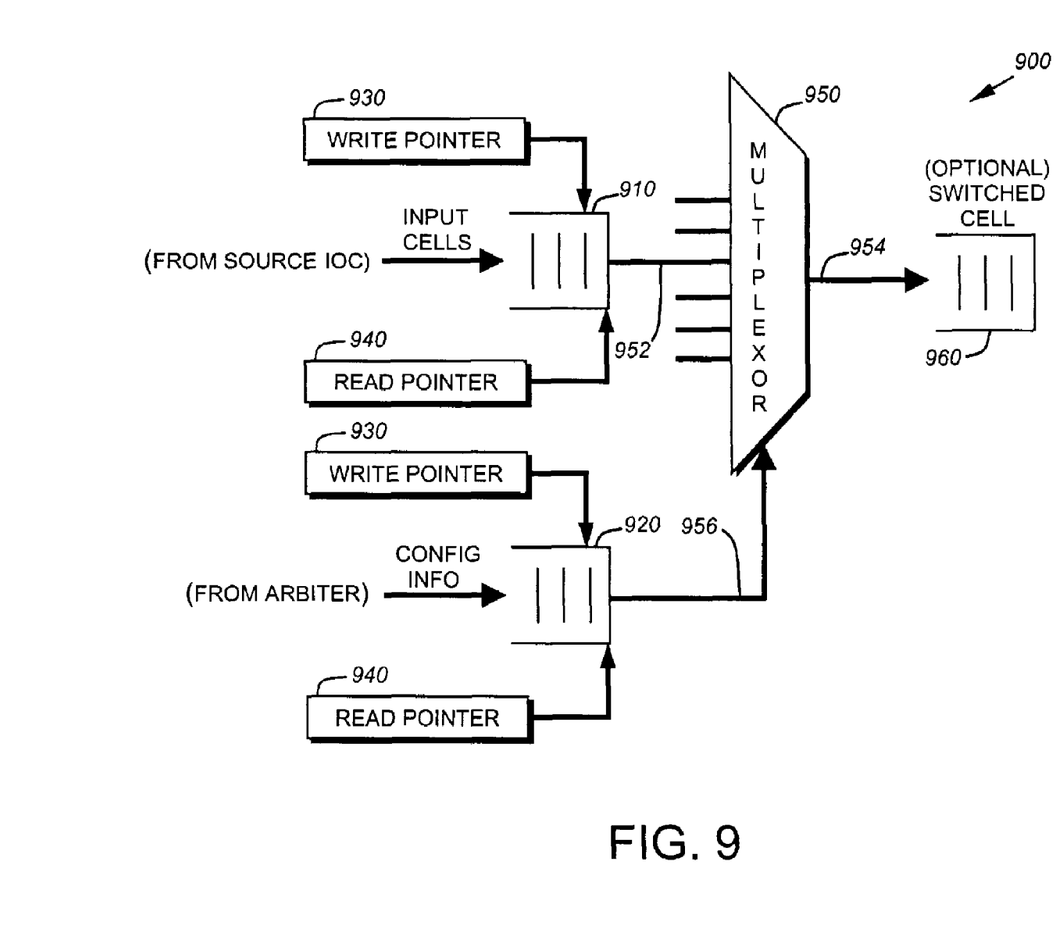
FIG. 9 is a schematic block diagram of logic circuitry functioning as synchronization logic in accordance with the present invention.

FIG. 9 is a schematic block diagram of logic circuitry 900 within an output switch port of a CASE device 452. In the illustrative embodiment, the logic circuitry 900 functions as synchronization logic that is essentially independent per output switch port and therefore scales easily with the size of the crossbar (port count). For example, the logic 900 is replicated n times within the crossbar devices, wherein n equals the number of IOCs in the switch. The logic 900 comprises ring buffers, e.g., CellBuffers 910, functioning as input switch ports that store data cells received from source IOCs for switching through the crossbar switch fabric at particular cell times. A selector circuit (e.g., multiplexor 950) comprises a plurality of inputs 952, each associated with an input switch port, an output 954 associated with an output switch port of the crossbar fabric and a selection terminal (line) 956 for selecting a particular input to be passed to the output 954. Each input switch port is further associated with a source IOC and each output switch port is associated with a destination IOC.

The multiplexor 950 performs the actual switching within the crossbar fabric. That is, the multiplexor accepts data cells from all input switch ports having data cells to transmit through the crossbar switch fabric and multiplexes through those data cells according to configuration vectors used to enable (select) various inputs of the multiplexor. To that end, the logic 900 also includes a ring buffer, ConfigBuffer 920, that stores the configuration vectors received from the arbiter 470 pertaining to the data cells that will be switched at the cell times. There is illustratively one ConfigBuffer associated with each output switch port, just as there is one CellBuffer associated with each input switch port.

Each configuration vector stored in the ConfigBuffer 920 represents an arbitration result for a particular cell time that enables the multiplexor to select various inputs for switching to its output of the crossbar switch fabric. In the illustrative embodiment, four clock "ticks" are needed to switch a cell through the multiplexor 950 of each output port. When a data cell and its associated configuration vector arrive at the heads of their respective buffers, the vector stored in the ConfigBuffer 920 is provided over line 956 to the multiplexor, which "locks on" the selected CellBuffer 910 at input 952 for those four clock ticks to switch the cell to output 954 for storage in an optional register pipeline, which may be illustratively implemented as output FIFO 960. Storage of a cell in the FIFO 960 thus denotes "switching" of the cell through the crossbar fabric to a destination switch port. The output FIFO 960 is used to accommodate crossing of synchronous clock domains such as, e.g., the switching domain of logic 900 to a SERDES clock domain.

The depths of the ring buffers in logic 900 are adjusted to compensate for the differing lengths of the links/paths throughout the switch. For example, the depth of the ConfigBuffer 920 is illustratively 16 entries to accommodate a loop bandwidth using 3 Gbps SERDES serial links on the backplane 250. Such a depth allows the buffer to absorb skew equal to as much as 16 cell time differences that is introduced into the communication paths as a result of differing lengths between the links. In other words, when the arbiter 470 chooses connection information for an input switch port and output switch port, those cells are actually switched 16 cell times later. It should be noted that ConfigBuffer is generally "deeper" than CellBuffer, but ConfigBuffer holds less information than CellBuffer so the memory requirements are not overwhelming.

Associated with each ring buffer are a write pointer 930 that references an address at which to store (write) information in the buffer and a read pointer 940 that references an address at which to retrieve (read) information from the buffer. These pointers are illustratively implemented as counters configured to provide read and write addresses for each buffer. Each ring buffer is accessed by constantly incrementing the pointers, with the read pointer 940 "chasing" the write pointer 930 by a fixed offset. Notably, the addresses of the write pointers may vary among the ring buffers because data cells arrive at their associated buffers at different times as a result of, e.g., latencies (skew) from differing etch lengths coupling the IOCs to the SFC module. However, the read pointers "point to" the same address locations within the ring buffers at the same time. That is, the read pointers 940 step through all the ring buffers in "lock step." The differences between the read and write pointers represent those margins within the "not fixed" time periods that are absorbed by the ring buffers.

To correctly set, i.e., initialize, the pointers associated with the ring buffers, a plurality of novel control signals is utilized. As described herein, one of these signals is a special control cell used to establish where data cells are written into the ring buffers, thereby setting/calibrating the write pointers. These control signals assert during one cell time slot every SyncPeriod to align (or check the alignment if already aligned) the data path. Illustratively, SyncPeriod is an arbitrary integer multiple of RingDepth that is bounded by two quantities: a maximum allowable overhead (defining the minimum period) and a minimum expected error rate (defining the maximim period). For instance, one in every SyncPeriod cells is the special control cell with no user data; as a result, SyncPeriod may be arbitrarily large to reduce the control cell overhead below a desired level. SyncPeriod may also be related to an expected error rate of the data path for lossy paths.

A first control signal, ConfigMark, travels with the configuration vector from the arbiter to the crossbar switch fabric and asserts at a period equal to an integer multiple of the RingDepth, e.g., T Cntrl Cell I-N. Illustratively, ConfigMark is a special digital control "sync" signal that asserts once every SyncPeriod. Upon reception of this signal, ConfigBuffer 920 resets its write pointer to zero so that the next configuration vector is written starting at location zero. This signal also travels to all source IOC modules (as, e.g., the specially "marked" grant message 500) so that each module generates a special control cell for that time slot.

A second control signal, CellMark, travels with a stream of cell data and represents overhead of the novel synchronization technique. CellMark may be embodied as a sideband bit, an in-band control bit or the special control cell with no user data. Illustratively, CellMark is a 64-byte cell with control symbols in its header that identifies it as the special control cell. Upon reception of this signal, CellBuffer 910 sets its write pointer to zero so that the next cell is written starting at location zero. Thereafter, data cells are written contiguously (in sequential address order) as they are received at the ring buffer and "wrap" back to address zero once address N-1 has been written.

A third digital control signal, CellSync, also travels from the arbiter to the crossbar fabric and asserts, e.g., once every SyncPeriod, but is out-of-phase with the ConfigMark signal. The time difference from ConfigMark to CellSync is greater than the loop time, but smaller than the time to traverse one ring buffer. Upon reception of this third signal, both ConfigBuffer and CellBuffer set their read pointers to zero so that the next configuration vector and the next cell are read in parallel from locations zero in both buffers.

The difference between the read and write pointers is illustratively a fixed design constant representing the sum of maximum "not fixed" latencies. Whereas the IOCs generate the special control cell CellMark in response to a special grant signal issued by the arbiter, the arbiter generates and transmits CellSync and ConfigMark signals to the crossbar switch fabric. By offsetting the CellSync and ConfigMark signals in time, the maximum design constant can be set and reflected as the depth (RingDepth) of the ring buffer. The arbiter may include a programmable register that varies the offset between those signals to thereby accommodate various latencies created by varying etch lengths between the IOCs and the SFC.

In sum, synchronization of the crossbar switch fabric (and switch) is achieved and maintained on a long time scale, e.g., once every SyncPeriod. At that time, the arbiter 470 allows CellMark to be switched during a particular cell time when no data is switched during that time. That is, instead of sending a data cell during this particular control time, each IOC is instructed to send the CellMark to the SFC 400 to be switched during that particular cell time. Although CellMark has a specific format, it exhibits the same latency as if it were fetched from the buffering and queuing system of the IOC (as any data cell). CellMark is then forwarded to the SFC 400 and onto a CASE 452, where it passes through the logic 900.

Figure 10:
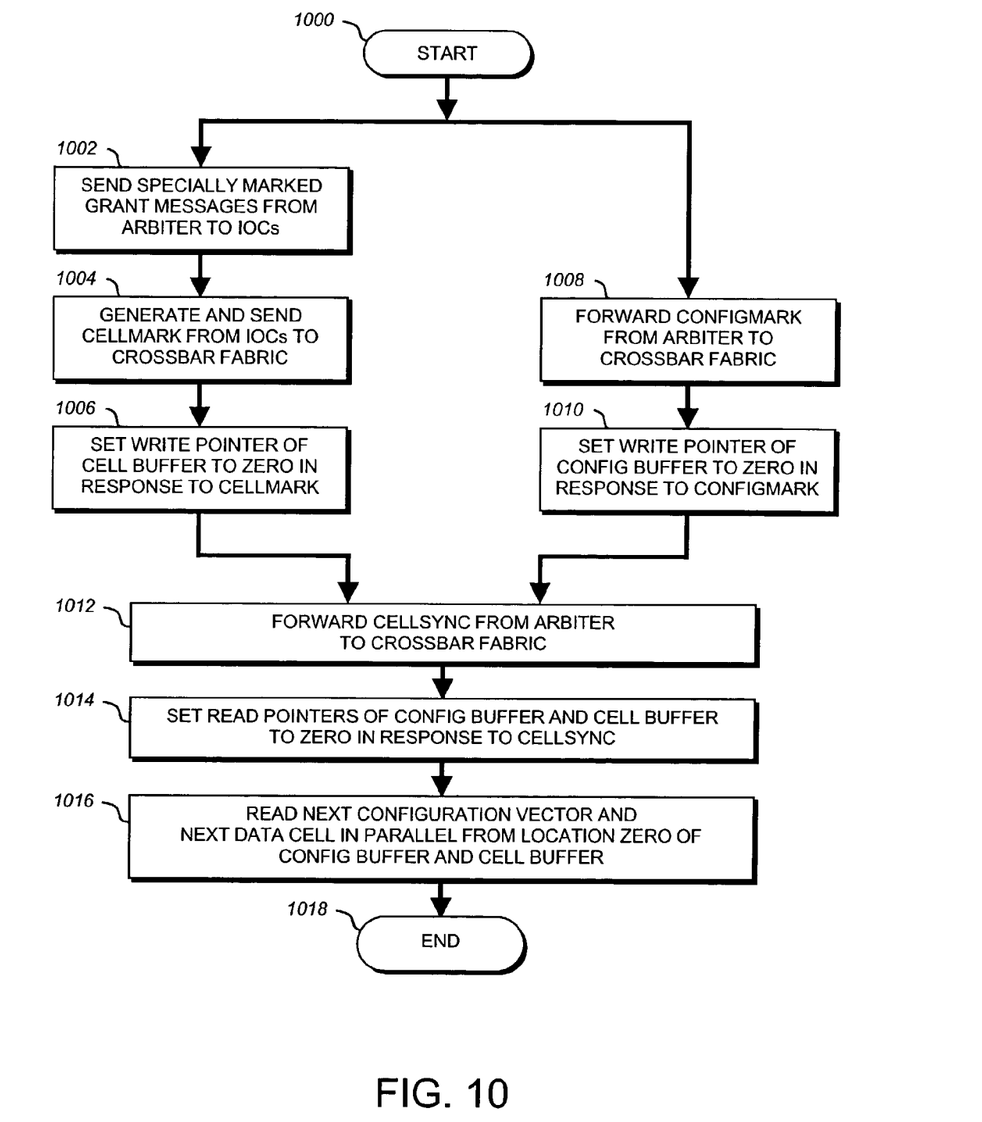
FIG. 10 is a flowchart illustrating a sequence of steps for synchronizing the crossbar switch fabric according to a crossbar synchronization technique of the invention.

FIG. 10 is a flowchart illustrating a sequence of steps for synchronizing the crossbar switch fabric 450 according to the crossbar synchronization technique of the invention. The sequence starts at Step 1000 and proceeds to Step 1002 where, to initiate the flow of CellMark cells, the arbiter 470 sends specially marked (ConfigMark) grant messages 500 to the IOCs. These grant messages instruct the IOC modules to generate and send the CellMark cells to crossbar fabric (Step 1004). Upon receiving the CellMark cell, the write pointer of each CellBuffer 910 is set to address zero at Step 1006. In parallel with Steps 1002–1006, the arbiter forwards ConfigMark to the crossbar fabric at Step 1008. Upon receiving the ConfigMark signal, the write pointer of ConfigBuffer 920 is set to address zero at Step 1010.

At a predetermined time after forwarding ConfigMark, the arbiter forwards CellSync to the crossbar fabric (Step 1012). Upon receiving the CellSync signal, the read pointers for ConfigBuffer and CellBuffer are each set to address zero at Step 1014. At Step 1016, the next configuration vector and next data cell are read in parallel from locations zero of ConfigBuffer and CellBuffer to thereby synchronize the crossbar switch fabric. The sequence then ends at Step 1018.

As soon as every control signal asserts once, the data path is in synchronization and remains synchronized as long as the source IOC and SFC clock signals are truly synchronous. Subsequent steady streams of configuration vectors and data cells should thereafter be aligned. That is, once synchronization is established, subsequent special control CellMark cells arriving at the ring buffers should always "align" with the write pointers indicating address zero. Ideally, subsequent issuances of these control cells are used as system integrity "checks" to ensure synchronization of the ring buffers.

For example, periodic checks can be performed at SyncPeriod intervals to verify that the data path is in synchronization, particularly for lossy transmission paths. A simple check is that if either the ConfigMark or CellMark ("Mark") signal is asserted when the respective pointers are not set to zero, the data path is out of synchronization. A more complete check for each buffer utilizes a counter with a range of zero to SyncPeriod that is set to zero with the buffer address, and that is compared with a value of a previous SyncPeriod on each Mark signal assertion. This latter check enables detection of missing Mark signals by monitoring when the counter passes (exceeds) the value of the previous SyncPeriod. An even "stronger" check forwards the Mark signals through each buffer with the configuration vector and the cell data to verify that they always assert together, coincident with the CellSync signal. All of these checks can be performed with minimal hardware and reported via asynchronous methods, such as interrupts, so that data path synchronization is essentially "self-monitoring".

According to another aspect of the inventive technique, the special control cells and special configuration information cooperate to provide a training sequence that occurs during initialization of the switch. In other words, at initialization the switch "learns" the difference in time between the arbiter and the IOC, and adjusts itself accordingly. The sequence is repeated periodically over a long time period to ensure synchronization throughout the switch and to prevent bit errors from arising over the high-speed serial links. The training sequence also prevents other invariants that arise due to, e.g., insertion of new modules in the switch. If a subsequent issuance of a control cell does not align with address zero, a potential problem exists within the switch and software is executed to reset the switch. Therefore, this process represents a fault detection mechanism of the network switch.

Advantageously, the crossbar synchronization technique is generic in the sense that many of its parameters are flexible and scale well with bandwidth and/or technology. For example, the novel synchronization technique is scalable in terms of cell size, port count, bandwidth, and inter-module latency and skew. Cell size and RingDepth determine the required memory per port, which can easily be kept under one kilobyte per port. In addition, there is no feedback in the data paths and, as such, there is no minimum cell size constraint. The ring buffer requirements increase linearly with the number of ports and there is no port-to-port signaling. As for scalable bandwidth, no feedback paths and no inter-port signaling imply that this parameter scales with technology to go as fast and wide as memory allows. Moreover, simply expanding or contracting the ring buffer depth allows scaling to adapt to smaller or larger latencies, skews or line card module cell fetch times.

In addition, all control signals and cells are independent and function in accordance with independent ring buffers, thereby enabling efficient scaling of the logic comprising the network switch. In particular, as more IOCs and associated input ports are added to the switch, only the multiplexor in each output switch port of the switch fabric needs to be enlarged to accommodate those input ports. Approximately once every SyncPeriod, a timer within the arbiter triggers generation of the control cells/signals. During this special control cell time, the arbiter ignores all input requests directed to transmission of data cells and inserts the control cells/signals as "overhead" associated with the data and control paths of the switch.

While there has been shown and described an illustrative embodiment for synchronizing a crossbar switch fabric of a network switch having a plurality of modules configured to transmit and receive data at high speeds, it is to be understood that various other adaptations and modifications may be made within the spirit and scope of the invention. For example, although the illustrative embodiment includes a central clock source that distributes clock signals used by the SERDES devices to run "frequency locked", CDR logic within the SERDES devices is adaptive to thereby enable rate adaptation with slightly different frequencies. That is, the synchronization technique operates well with clock signals on each module that are not locked in frequency, but are within a certain "parts per million" tolerance of each other.

For this embodiment, the SERDES devices employ a simple rate-matching approach of adding or dropping special symbols to match frequency variances manifested in commodity oscillator devices. This approach works as long as the special add/drop symbols are contained only within control cells, which requirement can be easily met with the novel synchronization technique. The rate adaptation capability of the CDR logic thus obviates the need for a central clock source and an associated clock distribution system, thereby enabling a cost effective solution. Synchronous clocking is therefore not a requirement of the switch and asynchronous serial communication path links may function well with the inventive technique.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A system adapted to synchronize a crossbar switch fabric of a network switch having a plurality of modules, the crossbar switch fabric residing on a switch module and operating on data cells received from line card modules over serial communication paths of the switch, the system comprising:
    a selector having a plurality of inputs, an output and a selection line;
    a plurality of ring buffers configured to absorb skew introduced into the communication paths, a first ring buffer coupled to the selection line of the selector and configured to hold configuration information delivered from an arbiter of the switch, and a plurality of second ring buffers, each second ring buffer coupled to an input of the selector and configured to hold a stream of data cells transmitted from a source line card module;
    a plurality of pointers associated with each ring buffer, the pointers comprising a write pointer that references an address at which to store information in the ring buffer and a read pointer that references an address at which to retrieve information from the ring buffer; and
    a plurality of control signals configured to initialize the read and write pointers associated with each ring buffer.

2. The system of claim 1 wherein the configuration information is a vector generated by the arbiter, the vector comprising an instruction that enables an input of the selector to pass a data cell to the output of the selector.

3. The system of claim 1 wherein each pointer is implemented as counter configured to provide an address for each buffer.

4. The system of claim 1 wherein the ring buffers are embodied as first-in first-out buffers.

5. The system of claim 1 wherein the selector is a multiplexor.

6. The system of claim 5 wherein the input of the multiplexor is associated with an input switch port of the crossbar switch fabric and the output of the multiplexor is associated with an output switch port of the crossbar fabric.

7. The system of claim 1 wherein the plurality of control signals comprise:
    a first control signal traveling with the configuration information and adapted to set the write pointer of the first ring buffer to zero;
    a second control signal traveling with a stream of data cells and adapted to set the write pointer of the second ring buffer to zero; and
    a third control signal traveling from the arbiter, but out-of-phase with the first control signal, the third control signal adapted to set the read pointer of the first and second ring buffers to zero so that next configuration information and a next data cell are read in parallel from locations zero in both buffers.

8. A method for synchronizing a crossbar switch fabric of a network switch having a plurality of modules, the crossbar switch fabric residing on a switch module and operating on data cells received from line card modules over serial communication paths of the switch, the method comprising the steps of:
    sending specially marked grant messages from an arbiter on the switch module to the line card modules to initiate flow of CellMark cells to the crossbar switch fabric;
    forwarding a ConfigMark signal from the arbiter to the crossbar switch fabric;
    upon receiving the ConfigMark signal, setting a write pointer of a ConfigBuffer of the crossbar switch fabric to address zero;
    upon receiving a CellMark cell, setting a write pointer of a CellBuffer of the crossbar switch fabric to address zero;
    at a predetermined time after forwarding the ConfigMark signal, forwarding a CellSync signal from the arbiter to the crossbar switch fabric;
    upon receiving the CellSync signal, setting read pointers for the ConfigBuffer and CellBuffer to address zero; and
    reading a next configuration vector and next data cell in parallel from locations zero of the ConfigBuffer and the CellBuffer to thereby synchronize the crossbar switch fabric.

9. A system adapted to synchronize a crossbar switch fabric of a network switch having a plurality of modules, the crossbar switch fabric residing on a switch module and operating on data cells received from line card modules over serial communication paths of the switch, the system comprising:

a selector having a plurality of inputs, an output and a selection line;

a plurality of ring buffers configured to absorb skew introduced into the communication paths, a first ring buffer coupled to the selection line of the selector and configured to hold configuration information delivered from an arbiter of the switch, and a plurality of second ring buffers, each second ring buffer coupled to an input of the selector and configured to hold a stream of data cells transmitted from a source line card module;

a plurality of pointers associated with each ring buffer, the pointers comprising a write pointer that references an address at which to store information in the ring buffer and a read pointer that references an address at which to retrieve information from the ring buffer; and a plurality of control signals configured to initialize the read and write pointers associated with each ring buffer, wherein the control signals include:

(i) a first control signal traveling with the configuration information and adapted to set the write pointer of the first ring buffer to zero;

(ii) a second control signal traveling with a stream of data cells and adapted to set the write pointer of the second ring buffer to zero; and (iii) a third control signal traveling from the arbiter, but out-of-phase with the first control signal, the third control signal adapted to set the read pointer of the first and second ring buffers to zero so that next configuration information and a next data cell are read in parallel from locations zero in both buffers.

10. The system of claim 9 wherein the configuration information is a vector generated by the arbiter, the vector comprising an instruction that enables an input of the selector to pass a data cell to the output of the selector.

11. The system of claim 9 wherein the selector is a multiplexor.

12. The system of claim 11 wherein the input of the multiplexor is associated with an input switch port of the crossbar switch fabric and the output of the multiplexor is associated with an output switch port of the crossbar fabric.

13. The system of claim 12 wherein the ring buffers are first-in first-out buffers.

14. A method for synchronizing a crossbar switch fabric of a network switch having a plurality of modules, the crossbar switch fabric residing on a switch module and operating on data cells received from line card modules over serial communication paths of the switch, the method comprising the steps of:

setting a write pointer of a configuration buffer of the crossbar switch fabric to address zero in response to a first control signal;

setting a write pointer of a cell buffer of the crossbar switch fabric to address zero in response to a second control signal;

setting read pointers for the configuration and cell buffers to address zero in response to a third control signal; and reading a next configuration vector and next data cell in parallel from locations zero of the configuration and cell buffers to thereby synchronize the crossbar switch fabric.

15. The method of claim 14 further comprising the steps of:

sending specially marked grant messages from an arbiter on the switch module to the line card modules to initiate flow of second control signals to the crossbar switch fabric; and forwarding the first control signal from the arbiter to the crossbar switch fabric.

16. The method of claim 15 further comprising the step of, at a predetermined time after forwarding the first control signal, forwarding the third control signal from the arbiter to the crossbar switch fabric.

17. Apparatus for synchronizing a crossbar switch fabric of a network switch having a plurality of modules, the crossbar switch fabric residing on a switch module and operating on data cells received from line card modules over serial communication paths of the switch, the apparatus comprising:

means for setting a write pointer of a configuration buffer of the crossbar switch fabric to address zero in response to a first control signal;

means for setting a write pointer of a cell buffer of the crossbar switch fabric to address zero in response to a second control signal;

means for setting read pointers for the configuration and cell buffers to address zero in response to a third control signal; and means for reading a next configuration vector and next data cell in parallel from locations zero of the configuration and cell buffers to thereby synchronize the crossbar switch fabric.

18. The apparatus of claim 17 further comprising:

means for sending specially marked grant messages from an arbiter on the switch module to the line card modules to initiate flow of second control signals to the crossbar switch fabric; and means for forwarding the first control signal from the arbiter to the crossbar switch fabric.

19. The apparatus of claim 18 further comprising means for forwarding the third control signal from the arbiter to the crossbar switch fabric.

20. A computer readable medium containing executable program instructions for synchronizing a crossbar switch fabric of a network switch having a plurality of modules, the crossbar switch fabric residing on a switch module and operating on data cells received from line card modules over serial communication paths of the switch, the executable program instructions comprising program instructions for:

setting a write pointer of a configuration buffer of the crossbar switch fabric to address zero in response to a first control signal;

setting a write pointer of a cell buffer of the crossbar switch fabric to address zero in response to a second control signal;

setting read pointers for the configuration and cell buffers to address zero in response to a third control signal; and reading a next configuration vector and next data cell in parallel from locations zero of the configuration and cell buffers to thereby synchronize the crossbar switch fabric.

* * * * *